250-203.R 56 CROSS REFERENCE EXAMINER

Nov. 7, 1967 I. WEIMAN ET AL 3,351,493

DIFFUSED RADIATION TRACKING TRANSDUCER HAVING
A LATERAL PHOTO VOLTAGE JUNCTION

Filed Feb. 25, 1964 2 Sheets-Sheet 1

IRVING WEIMAN,
WILLIAM V. WRIGHT,
INVENTORS.

BY Spensley and Horn

ATTORNEYS

IRVING WEIMAN,
WILLIAM V. WRIGHT,
INVENTORS.

BY Spensley and Horn

ATTORNEYS.

United States Patent Office 3,351,493
Patented Nov. 7, 1967

3,351,493

DIFFUSED RADIATION TRACKING TRANSDUCER HAVING A LATERAL PHOTO VOLTAGE JUNCTION

Irving Weiman and William V. Wright, San Marino, Calif., assignors to Electro Optical Systems, Inc., Pasadena, Calif., a corporation of California Filed Feb. 25, 1964, Ser. No. 347,655
8 Claims. (Cl. 136—89)

This application is a continuation-in-part of copending application Ser. No. 51,104, filed Aug. 22, 1960, and now abandoned, by the same inventors and assigned to a common assignee.

This invention relates to a radiation transducer and more particularly to a transducer of the type which produces a signal representative of the position of a radiation beam.

The effect of radiation on a semiconductor junction device, as is well known, serves to produce a photo voltage between the two sides of the junction. This invention is designed to take advantage of the fact that a spot of light striking one side of the junction will cause a lateral photo voltage to be generated, i.e., one which is parallel to the junction.

While the present invention device will be described herein using light as an exemplary source of radiation, it is equally applicable to measure other radiation sources such as electrons, neutrons, nuclear particles as well as photons and the like.

When a spot of light strikes one side of a junction device or cell, the behavior within the illuminated region is similar to that of any junction photovoltaic cell. Hole-electron pairs are created in both P and N regions but the field at the junction sweeps the holes into the P region and the electrons into the N region. It is assumed for the purpose of this explanation that the junction device includes a P and an N region.

If, for example, the conductivity of the P region is much greater than that of the N region, as would be the case for a heavily doped P region (or P+ region), such P+ region may be thought of as an equipotential region and the holes will instantly distribute themselves uniformly over the region. At any other point, then, a deviation from equilibrium will appear, resulting in a transfer of holes back into the N region. The reinjected holes are minority carriers in the N region. A lateral field is therefore established which transfers the majority carriers from the point of illumination to the point of reinjection.

It will be understood by one skilled in the semiconductor art that the same lateral photo-voltage effect can be achieved by employing a P-type crystal within which there has been established an N-type region to provide a junction therebetween. Additionally, other combinations which provide "junctions" may be used.

A junction is herein defined as a transition region between regions of different conductivities, either as to magnitude or type. Thus, an N+ region in an N-type parent crystal as well as N— contiguous with a P— (i.e., less heavily doped than the usual doping level) may also be used in either N or P-type base or parent crystals.

The hereinabove described lateral photo-effect is employed in the present invention in a manner which maximizes the output voltage thus serving to increase the sensitivity of the device.

In addition, the present invention provides several embodiments which take particular advantage of the lateral photo effect which may be achieved by the use of a diffused junction semiconductor cell. The present invention device may be used as a transducer for two general types of operation. It may be used to make precise positioned measurements of relatively intense locally generated light spots. Autocollimators and optical amplifying systems are examples of this type of application. In addition, it may be used to make position measurements of relatively weak light spots of unknown intensity as in a tracking system.

In general, there are believed to be four main areas where this device finds particular utility. These are: tracking and guidance, computors and data processing, standard instrumentation, and control automation. Specific applications within these areas are:

(1) Track and guidance—
 (a) Radiation seeking missile
 (b) Beam riding missile
(2) Computers and data processing—
 (a) High speed summation of multiple vectors
 (b) Resolver
 (c) Axis transformation
(3) Instrumentation—
 (a) Transducer use—
  (1) Acceleration in two coordinates
  (2) Pressure
  (3) Angular position
 (b) Instrument use
  (1) Curve follower
  (2) Light beam galvanometer magnifier It is therefore a primary object of the present invention to provide a photo cell having an unusually high sensitivity.

Another object of the present invention is to provide a photo cell having high sensitivity and a broad spectral response.

It is another object of the present invention to provide a photo cell of improved design whose output signal is representative of the position of a light spot.

It is a further object of the present invention to provide a photo cell which may be used to determine in two dimensions, the position of a received radiation beam.

Yet a further object of the present invention is to provide a cell of the character described which has a relatively high mechanical strength.

A still further object of the present invention is to provide a diffused junction photo cell shaped in such a manner as to produce an output signal representative of a non-planar system such as a cylindrical coordinate system.

Still a further object of the present invention is to provide a cell of the character described, the sensitivity of which is substantially constant over the surface thereof.

A further object of the present invention is to provide a photo cell which may be used to determine in two dimensions, the position of a received radiation beam.

In accordance with the presently preferred embodiment of this invention, the transducer includes a lateral photo cell having a cylindrically shaped thin wafer of N-type conductivity silicon. Within and parallel to one surface of the N-type wafer there is a diffused P-type region whose thickness is substantially less than that of the over-all thickness of the wafer. Four ohmic contacts radially equidistant from the center of the N side of the wafer are provided. These contacts are spaced 90° apart and opposed contacts are connected to meter terminals for voltage measurement. The wafer is shrouded to mask out all surfaces from exposure to radiation except most of the outer surface of the diffused P-type region which is sensitive to the received radiation beam. By measuring the voltages across opposed contacts on the face of the wafer opposite that receiving the radiation the vertical and horizontal position of the beam on the receiving face can be determined.

The lateral photo cell used in the transducer, in accordance with the present invention, is of improved optical efficiency compared with existing devices due to the very thin diffused region through which electron-hole pairs must travel to reach the junction in the wafer. A much greater lateral current is developed when radiation passes through the thin side to the junction than with prior art photo cells where the opposite arrangement is employed. Moreover, a more linear output results since radiation does not pass through the base layer of the wafer, modulating the resistivity of the bulk material as a function of the radiation intensity. The resistivity of the diffused region, because of the impurities therein, is much less than the resistivity of the base material and hence its modulation with radiation energy is less, accounting for the more linear output.

The novel features which are believed to be characteristic of the present invention both as to organization and method of operation together with further objects and advantages thereof will be better understood from the following description considered in connection with the accompanying drawings in which several embodiments of the present invention are illustrated by way of example. It is to be expressly understood, however, that the drawings are for the purpose of illustration and description only and are not intended as a definition of the limits of the invention.

Figures 1, 2, 3, 4:
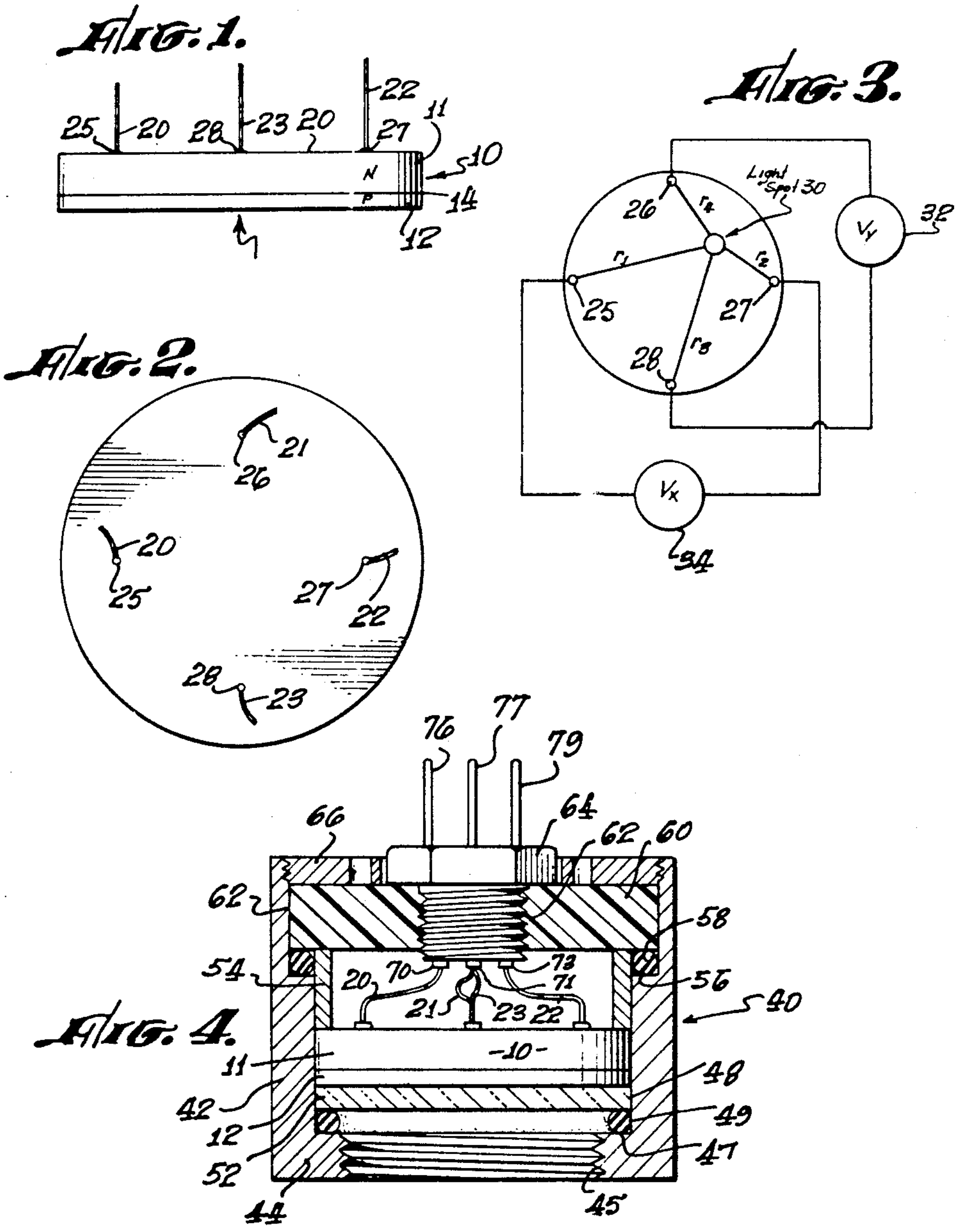
FIGURE 1 is a front elevation of a photo cell in accordance with the presently preferred embodiment of this invention.
FIGURE 2 is a plan view of the cell of FIGURE 1.
FIGURE 3 is a plan view similar to that of FIGURE 2, somewhat reduced in size, showing how the cell of FIGURES 1 and 2 may be used to determine the position of a light spot.
FIGURE 4 is an assembly view in section showing the photo cell of FIGURES 1 and 2 mounted in a supporting fixture.

Referring now to the drawings and particularly to FIGURE 1, there is shown a silicon semiconductor wafer 10. The wafer of body 10 includes a region 11 of N-type conductivity and a second adjacent region 12 of P-type conductivity resulting in a P-N junction 14, therebetween. The wafer 10 may preferably be produced as follows:

A single crystal of silicon is grown. Into the melt of pure silicon during the crystal growing process, there is added an N-type conductivity determining impurity such as phosphorous or arsenic. A typical diameter for the single crystal is three-quarters of an inch. The crystal is then sliced into wafers approximately ten mils thick. These wafers are lapped to an over-all thickness of approximately one to fifteen mils as described. By such a procedure the opposed major surfaces of the wafer may be made extremely flat and parallel, i.e., of the order of 1 solium fringe per inch.

P-type conductivity region 12 is produced by the diffusion process. One such process for the production of a P-type region as for example by the diffusion of boron, is described in U.S. Patent No. 2,802,760, entitled "Oxidation of Semiconductive Surfaces for Controlled Diffusion," by Derick and Frosch, issued Aug. 13, 1957. The process therein described is the so-called open-tube process. The P-type region may also be produced by the closed type tube process. One such process is described in U.S. Patent No. 2,827,403, by Hall and Levi, entitled "Method for Diffusing Active Impurities Into Semiconductor Materials," issued Mar. 24, 1958.

The diffusion process will permit the production of a highly controlled region of a given conductivity within a parent crystal of a different conductivity without altering the physical characteristics of the surface of the parent crystal such as the planarity thereof. Further, the diffusion process permits the production of an extremely uniform region which may be made to any desired and reproducible depth. In many instances, it is highly desirable to produce a device in which the junction is very close to the surface receiving the radiation beam. This is in order to minimize electron-hole recombination which will occur to a greater extent with an increased distance from the surface to the junction resulting in a reduction of the sensitivity of the device.

The sensitivity of the present invention device is dependent upon cell dimensions, material resistivity, light power and spot position. With cells having the following typical values:

$p$=10–40 ohm-cm.=semiconductor material resistivity
$d$=0.4–0.5 inch=wafer diameter
$w$=0.1–4.0 mils=diffused layer thickness Sensitivites ranging from 0.1 to 1.0 mv./milliinch-mv. have been achieved. These values make possible the construction of an electro-optical system capable of a resolution of 1/20 of a second of an arc. Sensitivity may be increased by increasing the resistivity or decreasing the thickness of the base region.

The present invention radiation transducer places unusually stringent requirements on the junction properties of the device. The output characteristics of the device map the photo-voltaic response of substantially the entire junction. Any materials defect, variation in resistivity or lifetime or junction depth will distort the output characteristics. Thus, the device requires a uniform junction and optimum semiconductor properties to an extent not required by other semiconductor devices. Moreover, these properties must be carefully controlled over an unusually broad geometrical area.

In one exemplary embodiment, the P-type region or layer 12 was diffused to a depth of 0.0005 inch within a three mil thick N-type conductivity wafer of a resistivity of 1000 ohm-cm. The resistivity of the thin P layer was .001 ohm-cm. which is considerably less than that of the N layer or base region.

It has been found by the inventors that the useful overall thickness including the diffused region of the semiconductor crystal body in accordance with this invention may vary in the range from 0.001 inch to 0.015 inch and that the diffused region within the body may vary in depth within the range of from 0.0001 inch to 0.004 inch.

In FIGURE 2 four leads 20–23 are shown to be attached in ohmic contact with the base region 11. A method which has proved to be most satisfactory in producing these contacts involves the evaporation of gold discs 25–28 upon the upper surface 20 of region 11.

In FIGURE 3 there is shown an arrangement for determining the lateral position of a light spot indicated by the numeral 30. The spot 30 is shown to be off of the center or null position. By measuring the voltage between contacts 26 and 28 with meter 32 the vertical position may be determined. Similarly meter 34 connected between contacts 25 and 27 measures that voltage which is representative of the horizontal position of the light spot 30.

The cell 10 is shown in FIGURE 4 mounted within a supporting fixture designated by the numeral 40. The support 40 includes a generally cylindrical hollow housing 42 open at both ends. The lower end extends inwardly to define a flange section 44 which is internally threaded at 45 to receive a lens mounting, if desired. Resting upon the shoulder region 47 defined by the intersection of the inner wall 48 and the upper surface of the flange section is an O-ring 49. Intermediate the O-ring 49 and the cell 10 there is shown to be disposed a glass member 52 whose peripheral shape is the same as that of the cell. The glass member 52, serves to protect the surface of the cell from the ambient while also adding mechanical support thereto. As the surfaces of the cell and that of the member 52 may both be made extremely flat the support which may be offered by the glass is considerable. A spacer ring 54, whose O.D. is substantially equal to the I.D. of the wall of the housing, is provided atop region 12 of the cell 10. In the vicinity of the upper portion of the spacer ring 54 the inner wall assumes a larger I.D. resulting in a shoulder 56. Upon the shoulder 56 there is placed a second O-ring 58. Resting upon the O-ring 58 and upon the upper end of the spacer ring 54 is disc 60. The O.D. of the disc 60 is substantially equal to the I.D. of the inner wall of the housing at 62. The disc 60 defines a central threaded opening 62 to receive a plug 64 therein. An end ring 66 is threadably secured over the disc 60 within the housing. Lead wires 20–23 are connected to lower contacts 70–73 embedded within plug 64. These contacts terminate in prongs 76–79 for connection to an external system such as is shown in FIGURE 3.

Figure 5:
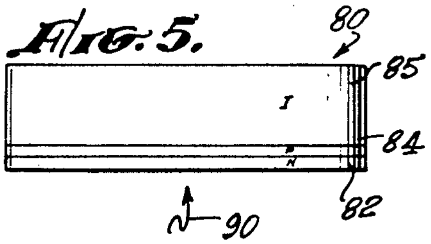
FIGURE 5 is a front elevation of an alternative embodiment of a photo cell in accordance with the present invention.

Referring to FIGURE 5, therein is shown an alternative embodiment of a photo cell in accordance with this invention. This device is double diffused photo cell 80 including a thin N-type region 82, a thin P-type region 84 and a substantially thicker I-type region 85. In cross-section the cell may be made similar to that of the cell of FIGURES 5, 1 and 2. It may be fabricated by first diffusing a P-type impurity into an I type parent crystal to produce region 84. Thereafter the N-type region 82 may be produced by a second diffusion step whereby an N-type impurity such as phosphorus will reconvert the portion 82 from P to N-type conductivity.

This double diffused construction produces a device in which the over-all thickness of the active regions is very small, i.e., of the order of one micron. This may be very important in order to further increase the sensitivity, as the output voltage is inversely proportional to the over-all thickness of the active portion of the cell. In such a device, the light would be received from a source such as 90. It is preferable to have the resistivity of the light receiving surface be of a lower resistivity while the resistivity of the P-type region should be of a much higher resistivity. Typical values for the most important parameters of such a device are:

| | Thickness (inch) | Resistivity (ohm-cm.) |
|---|---|---|
| N region | .0001 | .01 |
| P region | .0001 | 10 |
| I region | .005 | 5,000 |

Figure 6:
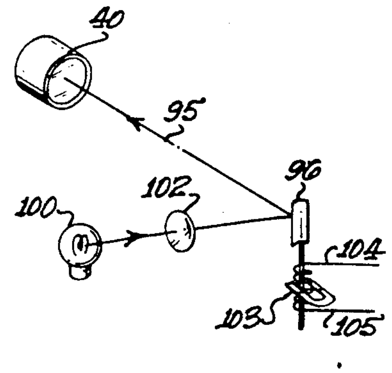
FIGURE 6 is a schematic view showing how the present invention device may be used to determine the angular position of a galvanometer mirror.

FIGURE 6 is an exemplary schematic drawing showing how the present invention device may be used as a resolvent transducer to indicate the angular position of a galvanometer.

The present invention device mounted in a support assembly 40 as shown in FIGURE 4 receives a beam of light 95 which is reflected by mirror 96. The light is received by the mirror 96 from light source 100 and condenser lens 102. As the mirror rotates on its axis under influence of the electro-magnetic field induced in winding 103 over leads 104 and 105 from a source, not shown, the angular position of the mirror varies. Thus, the output signal from the unit 40 is representative of the angle of the mirror and therefore of the signal received over leads 104 and 105. This arrangement results in a one dimension readout. By use of a gyro a two dimensional readout may be achieved with the present invention device.

The field of view of the present invention device for a use as above described is a function in large measure, of the area of the junction. For a system having a one inch focal length, useful output from the present invention device may be over an angle of 60 degrees. This device has a useful diameter on order of 1 inch.

Figure 7:
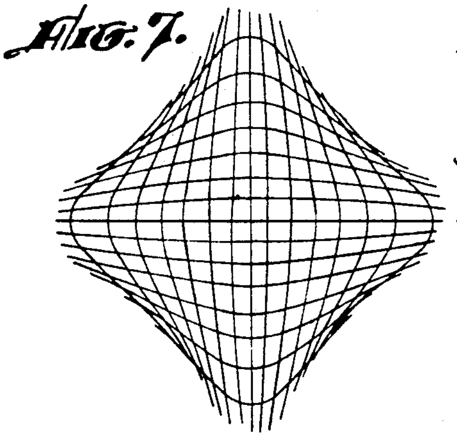
FIGURE 7 is a graph showing a plot of the output voltage over the surface of the cell of FIGURES 1 and 2 as a spot of light is moved thereacross.

FIGURE 7 shows a trace of a grid produced in the following manner. The cell output terminals are connected to an $x$—$y$ plotter and light spot is swept back and forth over the cell surface to form a rectangular grid. A recorder pen follows the light spot movement and traces out a modified grid. As is seen in FIGURE 7, the further the light spot moves away from the center the lesser is the degree of linearity. That is, there is a tendency for bulging toward each of the contacts. This may be improved by the use of simple passive circuitry.

Figure 9:
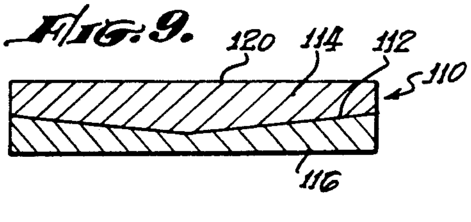
FIGURE 9 is a front elevation of a second alternative embodiment of the present invention cell.

In FIGURE 9 there is shown a cell 110 similar to that of FIGURES 1 and 2 in which the junction is purposely made nonplanar. The line 112 indicates the junction separating P-type region 114 from N-type region 116. The junction thus slopes in from the edges so that a greater distance exists between the light receiving surface 120 and the junction near the center of the device than exists near the edge. This will serve to obviate the non-linearity above mentioned.

The diffusion process by appropriate techniques permits the fabrication not only of a junction whose depth is tailored with distance for a planer device as is shown in FIGURE 9, but in addition, spherical, cylindrical or any other geometrical crystal shapes may be employed with either uniform or non-uniform junction depths. In addition, by appropriate masking techniques, various patterns, symmetrical or otherwise, may be produced. That is a diffused S-shaped junction or a T-shaped junction may be produced. Such may be desirable where encoding of the cell surface is required.

Figure 8:
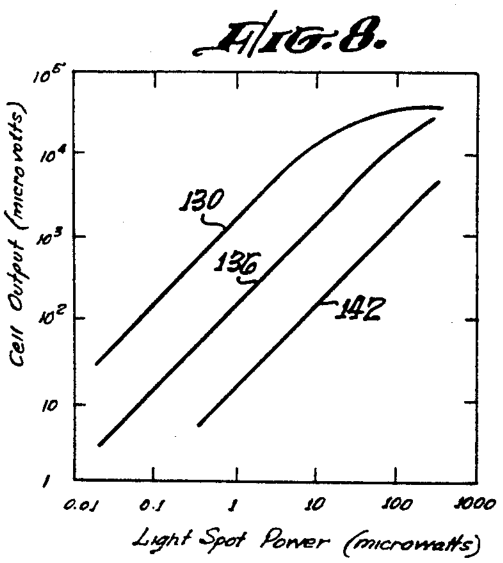
FIGURE 8 is a graph showing three different curves plotting cell output in millivolts as a function of light spot power in micro-watts for three different cells constructed in accordance with the present invention.

In FIGURE 8 there is a graph showing a plot of the log of cell output in micro-volts as a function of the log of light spot power in micro-watts for three different cells. Curve 130 represents a cell whose base resistivity is 1070 ohm-cm., curve 136, 107 ohm-cm., and curve 142, 13 ohm-cm. The junction depth is 0.0001 inch.

There has thus been described a new and improved radiation tracking transducer. While the device has been described with silicon as the material from which the cell is fabricated such was for purpose of clarity of explanation. Other semiconductor materials may also be used although silicon has been found to be preferable. Other semiconductor materials which may be used include germanium, silicon-germanium alloy, indium-antimonide, gallium arsenide and the like.

What is claimed is:

1. In a broad area radiation tracking transducer, a parent silicon crystal body;

said parent crystal body being of intrinsic conductivity, a first diffused region of a first conductivity type and of a predetermined resistivity disposed within said body along a first surface of said body, a second diffused region of a lower resistivity than said first diffused region, said second diffused region being adjacent said first diffused region, said second diffused region being disposed intermediate said first diffused region and the intrinsic conductivity portion of said crystal body, and means for measuring the lateral photo voltage between first and second spaced apart points in the intrinsic conductivity portion of said crystal body upon impingement of radiation energy upon said first diffused region, said measuring means including a first ohmic contact to said first point and a second ohmic contact to said second point.

2. In a broad area radiation tracking transducer, a semiconductor crystal body of a predetermined resistivity, said crystal body having first and second opposed planar surfaces, said crystal body having diffused within said first planar surface thereof a thin heavily doped region of a resistivity substantially lower than the resistivity of the remaining portion of said body, resulting in a lateral photo voltage junction.

first means for measuring the lateral photo voltage between first and second diametrically opposite points on said second planar surface of said wafer upon impingement of radiation energy on said first planar surface, said first measuring means including a first ohmic contact to said first point and a second ohmic contact to said second point, and, means for preventing radiation energy from impinging on any but said first surface of said body.

3. A radiation transducer as defined in claim 2, wherein said remaining portion of said body is of a first conductivity type and wherein said thin region is of a second conductivity type.

4. A radiation transducer as defined in claim 2, wherein said remaining portion of said body is of a first conductivity type and wherein said thin region is of a second conductivity type and further including second measuring means for measuring the lateral photo voltage between third and fourth diametrically opposite points on said second planar surface of said body upon impingement of radiation energy on said first planar surface, said third and fourth diametrically opposite points being positioned in quadrature with said first and second diametrically opposite points, said second measuring means including a third ohmic contact to said third point and a fourth ohmic contact to said fourth point.

5. A radiation transducer as defined in claim 2, and further including second measuring means for measuring the lateral photo voltage between third and fourth diametrically opposite points on said second planar surface of said body upon impingement of radiation energy on said first planar surface, said third and fourth diametrically opposite points being positioned in quadrature with said first and second diametrically opposite points, said second measuring means including a third ohmic contact to said third point and a fourth ohmic contact to said fourth point.

6. A radiation transducer as defined in claim 2, wherein said remaining portion of said body and said thin region are of the same conductivity type.

7. In a broad area radiation tracking transducer, a semiconductor crystal body having a first portion of a first conductivity, said first portion having therein a diffused region of a second conductivity, said diffused region having a resistivity which is substantially lower than that of the first conductivity portion of said body resulting in a lateral photo voltage junction, said first portion and said diffused region each having an outer surface spaced from said junction, means for measuring a lateral photo voltage between first and second spaced apart points on said outer surface of said first conductivity portion, upon impingement of radiation energy on said outer surface of said diffused region, said measuring means including a first ohmic contact to said first point and a second ohmic contact to said second point, and, means for preventing radiation energy from impinging on any but said diffused region outer surface of said body, said body having an over-all thickness in the range from .001" to .015" and said diffused region being of a depth in the range of .0001" to .004".

8. In a broad area radiation tracking transducer, a semiconductor crystal body having a first portion of a first conductivity, said body having at least one surface which is substantially flat and planar, a diffused region of a different conductivity within said body produced by diffusion of an active impurity into said one surface of said body, said diffused region having a resistivity which is substantially lower than that of the first conductivity portion of said body resulting in a lateral photo voltage junction, means for measuring the lateral photo voltage between first and second spaced apart points on a surface of said first conductivity portion upon impingement of radiation energy on said one surface of said crystal body, said measuring means including a first ohmic contact to said first point and a second ohmic contact to said second point, and, means for preventing radiation energy from impinging on any but said one surface of said body.

References Cited

UNITED STATES PATENTS 3,028,500 4/1962 Wallmark ---------- 250—211

OTHER REFERENCES

Wallmark, J. T.: Proceedings of the IRE, April 1957, pages 474–483. (Copy in Group 110.)

WINSTON A. DOUGLAS, *Primary Examiner.*

A. M. BEKELMAN, *Assistant Examiner.*